(12) United States Patent
Pritchett (10) Patent No.: US 11,262,991 B1
(45) Date of Patent: Mar. 1, 2022

(54) THREAD-SAFE DEVELOPMENT IN A MULTI-THREADED SYSTEM

(71) Applicant: Microsoft Technology Licensing, LLC, Redmond, WA (US)

(72) Inventor: Joel Stephen Pritchett, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/005,177

(22) Filed: Aug. 27, 2020

(51) Int. Cl.
*G06F 9/44* (2018.01)
*G06F 8/41* (2018.01)
*G06F 9/52* (2006.01)

(52) U.S. Cl.
CPC ............ *G06F 8/4451* (2013.01); *G06F 9/528* (2013.01)

(58) Field of Classification Search
CPC .............................. G06F 8/4451; G06F 9/528
USPC .......................................................... 717/149
See application file for complete search history.

(56) References Cited

U.S. PATENT DOCUMENTS

| | | | | |
|---|---|---|---|---|
| 7,383,389 | B1 * | 6/2008 | Bumbulis | G06F 16/24552 711/130 |
| 8,276,142 | B2 | 9/2012 | Alameldeen et al. | |
| 8,589,900 | B2 * | 11/2013 | Stoodley | G06F 9/3851 717/159 |
| 8,650,554 | B2 | 2/2014 | Elnozahy et al. | |
| 9,122,541 | B2 * | 9/2015 | Brazier | G06F 9/4881 |
| 9,529,645 | B2 * | 12/2016 | Srinivas | G06F 9/45516 |
| 9,530,006 | B2 * | 12/2016 | Troeger | G06F 21/53 |
| 10,001,930 | B2 * | 6/2018 | Feng | G06F 3/0613 |
| 2014/0082243 | A1 | 3/2014 | Betts et al. | |
| 2014/0229956 | A1 | 8/2014 | Fornaeus et al. | |
| 2016/0147640 | A1 * | 5/2016 | Huang | G06F 9/524 717/130 |

OTHER PUBLICATIONS

Guangpu Li et al., "Efficient Scalable Thread-Safety-Violation Detection", 2019, ACM, pp. 162-180. (Year: 2019).*
Gerakios et al., "Race-free and Memory-safe Multithreading: Design and Implementation in Cyclone", 2010, ACM, pp. 15-26. (Year: 2010).*
Luc Blaser, "Practical Detection of Concurrency Issues at Coding Time", 2018, ACM, pp. 221-231. (Year: 2018).*
"Multithreading the Entire Destiny Engine", Retrieved from: https://www.youtube.com/watch?v=v2Q_zHG3vqg, Jan. 22, 2017, 3 Pages.

(Continued)

*Primary Examiner* — Ted T. Vo
(74) *Attorney, Agent, or Firm* — Alleman Hall Creasman & Tuttle LLP (57) ABSTRACT

A method for thread-safe development of a computer program configured for parallel thread execution comprises maintaining a digital record of read or write access to a data object from each of a plurality of sibling threads executing on a computer system. Pursuant to each instance of read or write access from a given sibling thread, an entry comprising an indicator of the access type is added to the digital record. The method further comprises assessing the thread safety of the read or write access corresponding to each entry in the digital record and identifying one or more thread-unsafe instances of read or write access based on the assessment of thread safety.

20 Claims, 6 Drawing Sheets

(56) References Cited

OTHER PUBLICATIONS

Farshchi, et al., "Deterministic Memory Abstraction and Supporting Multicore System Architecture", In Proceedings of 30th Euromicro Conference on Real-Time Systems, Jul. 3, 2018, pp. 1-24.

Kotaba, et al., "Multicore In Real-Time Systems—Temporal Isolation Challenges Due to Shared Resources", In Technical Report of CISTER-TR-141209, Mar. 19, 2013, 8 Pages.

Leonard Emerson, Porter, "Single Thread Performance in the Multi-core Era", In Dissertation of University of California, 2011, 140 Pages.

Paun, et al., "On the Determinism of Multi-core Processors", In Proceedings of 1st French Singaporean Workshop on Formal Methods and Applications, Jul. 15, 2013, pp. 32-46.

\* cited by examiner

RECORD TABLE 410A

- read obj = 0x0101 (\mygame\ships\) task = 0x0FE123 (\mygame\kinematic.cs)
- write obj = 0x0101 (\mygame\ships\) task = 0x0FE123 (\mygame\kinematic.cs)
- ...
- read obj = 0x01AA (\mygame\harbor\) task = 0x0FE123 (\mygame\kinematic.cs)

RECORD TABLE 410B

- read obj = 0x0101 (\mygame\ships\) task = 0x0486A0 (\mygame\battle.cs)
- write obj = 0x0101 (\mygame\ships\) task = 0x0486A0 (\mygame\battle.cs)
- ...
- read obj = 0x01AA (\mygame\catapults\) task = 0x0486A0 (\mygame\battle.cs)

THREAD-SAFE DEVELOPMENT IN A MULTI-THREADED SYSTEM

BACKGROUND

Multi-core processing systems are increasingly prevalent in computer systems ranging from mobile devices, through personal computers and game systems, to high-performance network servers. Relative to a single processor core, a system of N identical processor cores offers, potentially, an N-fold increase in processing bandwidth. In order to take practical advantage of the increased processing bandwidth, programs executing on a multi-core processing system must support some form of parallel processing. In some examples, a program may use parallel threading, where two or more tasks execute on different program threads but may access the same data objects.

SUMMARY

Disclosed herein is an example method for thread-safe development of a computer program configured for parallel thread execution. The method comprises maintaining a digital record of read or write access to a data object from each of a plurality of sibling threads executing on a computer system. Pursuant to each instance of read or write access from a given sibling thread, an entry comprising an indicator of the access type is added to the digital record. The method further comprises assessing the thread safety of the read or write access corresponding to each entry in the digital record and identifying one or more thread-unsafe instances of read or write access based on the assessment of thread safety.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any or all disadvantages noted in any part of this disclosure.

DETAILED DESCRIPTION

As noted above, parallel threading is one strategy for leveraging the available processing bandwidth of a multi-core processing system. Parallel threading may provide other advantages, even in single core systems, such as the ability to execute code asynchronously and thereby avoid unwanted blocking. Despite these advantages, the process of developing robust, high performance, multi-thread software can be challenging. Particular challenges exist in scenarios where tasks executing asynchronously on parallel program threads must access the same instance of a data object. In that scenario (further described hereinafter), parallel, asynchronous execution may result in unpredictable and/or unstable behavior. This effect can be difficult to avoid when, for example, program code originally developed for a single-threaded system is modified to operate on plural threads and/or cores.

The disclosure herein provides methods that address the above issues and offer further advantages. In particular, methods are provided that record and analyze each instance of read or write access to selected, shared data objects. When an instance of thread-unsafe access is detected, that instance is reported to the program developer. The methods herein may be invoked from an integrated development environment (IDE) or debugger operating on a developer computer, for example.

The balance of this disclosure is now presented by way of example and with reference to the drawing figures listed above. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

Figure 1:
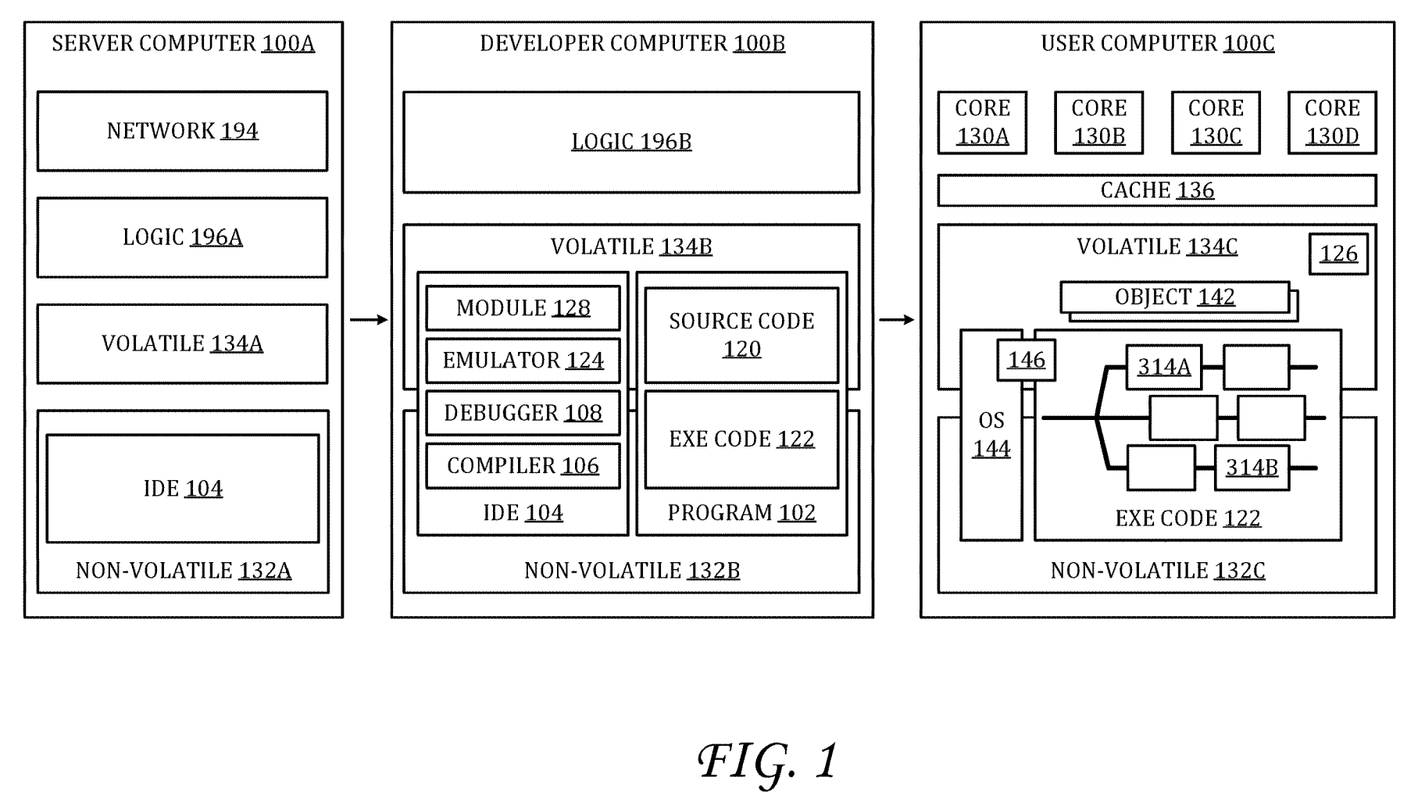
FIG. 1 shows aspects of an example network of computer systems including a developer computer, a user computer, and a server computer.

Turning now to the drawings, FIG. 1 shows aspects of an example developer computer 100B and user computer 100C. In some examples, the developer computer may take the form of a personal computer or server-computer system. Developer computer 100B is configured to support development of a computer program 102 to be executed on user computer 100C. To that end, the developer computer includes IDE software 104 including a compiler 106 and a debugger 108. The IDE software may also include a text editor and various local and/or network-accessible libraries (not shown in the drawings). Compiler 106 receives source code 120 composed by one or more developers and generates corresponding executable code 122, which executes on user computer 100C or on developer computer 100B. In some examples, the executable code may execute on the developer computer via emulator 124. An emulator is useful in scenarios where computer program 102 is developed for execution on a user computer 100C that differs substantially from developer computer 100B. For instance, if developer computer 100B is a personal computer or server system used to develop a program for execution on a game system or mobile device, then emulator 124 may be configured to emulate the game system or mobile device on the developer computer. In examples in which a user computer 100C is directly connected to developer computer 100B, the emulator may be omitted.

In some examples, compiler 106 may be configured to attach an instance of debugger 108 to executable code 122. In that scenario, debug information exposed by the debugger during execution of the executable code may be presented to the developer. In some examples, the debug information may be presented via IDE software 104. In other examples, the debug information may be presented directly by executable code 122 (e.g., in a console or pop-up window). The debug information may allow the developer to improve computer program 102 by adapting source code 120 to secure stability, enhance performance, etc. The debugger may be configured to retrieve a call stack 126 associated with any pointer call or function call originating from executable code 122 executing on user computer 100C (or any software emulation thereof). In the examples envisaged herein, a thread-safety module 128 is configured to enact the indicated aspects of the methods here disclosed. The thread-safety module may be associated with IDE software 104 or debugger 108, for example.

Continuing in FIG. 1, user computer 100C may be one of a plurality of user computers onto which executable code 122 of computer program 102 is distributed. The executable code, or any equivalent thereof, may be distributed on non-volatile data storage media, such as a flash drive or optical disc, or distributed via a network. The nature of computer program 102 is not particularly limited. The computer program 102 may be a system program or an application program. Example system programs include operating systems and extensions, hardware drivers, and class libraries for personal computers, mobile devices, game systems, and server systems. Example application programs include web browsers, productivity programs such as word processors, spreadsheets, email applications, SMS and navigation clients, and video games. Other application programs include application-server and web-server components. The foregoing list is not intended to be exhaustive.

In the example illustrated in FIG. 1, user computer 100C is a multi-core system having four substantially independent processor cores 130A through 130D. Each of the processor cores of the user computer is operatively coupled to non-volatile memory 132C and to volatile memory 134C via memory cache 136. In general, the user computer may include any number of processor cores. Naturally, any physical configuration indicated for user computer 100C may be represented functionally by emulator 124.

Figure 2:
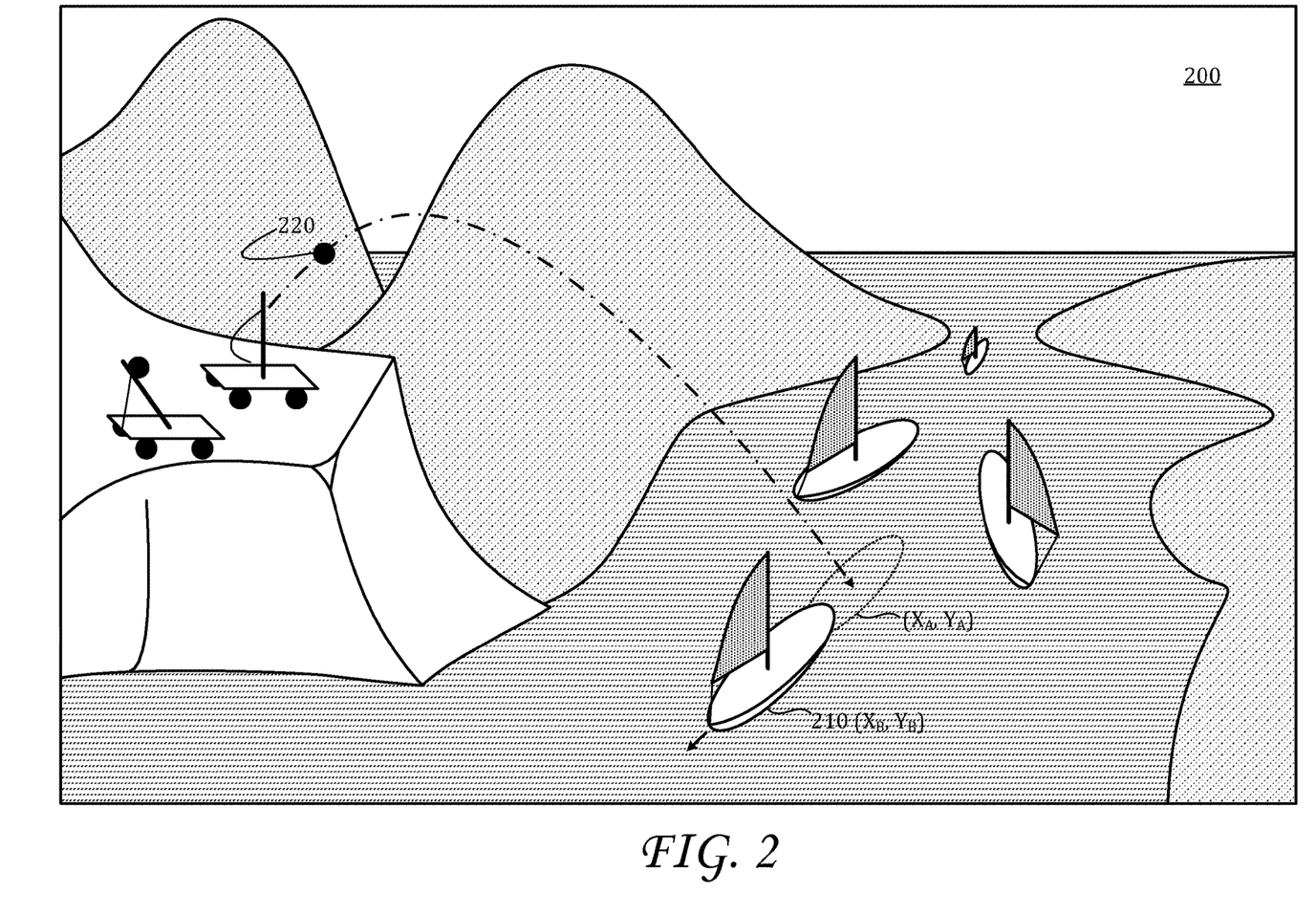
FIG. 2 shows aspects of an example video-game experience.

In some examples, executable code 122 takes the form of a game engine that executes on user computer 100C to support one or more video-game experiences. FIG. 2 is an illustration of one example video-game experience 200 as viewed from the perspective of a user—viz., a user viewing a display output of the user computer. This drawing shows a plurality of ships 210 in a harbor. Returning briefly to FIG. 1, various properties of each ship (its position and velocity, for instance) may be represented programmatically by a data object 142. A data object is a digital data structure. In some examples, data object 142 may be strongly typed and comprised of one or more (optionally hierarchical) data fields. In some examples, data object 142 may be an instance of a predefined object class, which includes methods and/or functions, although that aspect is not strictly necessary. In some examples, data object 142 may be stored in volatile (e.g., electronic) memory 134C of user computer 100C. In some examples, data object 142 may be stored in non-volatile (e.g., magnetic, optical, or electronic) memory 132C of the user computer.

During execution of executable code 122, data object 142 may be accessed by different tasks, which may execute on a plurality of parallel program threads. In some examples, different threads may execute on different processor cores, although that feature is not strictly necessary. The term 'task' refers herein to a predefined sequence of one or more methods or functions; the term 'program thread' refers to a substantially independent path of execution of one or more tasks. In some examples, data objects may be accessed via a pointer system supported by operating system (OS) 144 of user computer 100C. FIG. 1 shows an example pointer 146 being passed from executable code 122 to OS 144, which enables read or write access to data object 142. In some examples, pointer 146 may be an unmodified pointer native to OS 144. In other examples, pointer 146 is modified to pass information to thread-safety module 128. In some examples, the data object 142 may be one of a plurality of data objects instantiated by executable code 122 and analogously stored and accessed.

Figure 3:
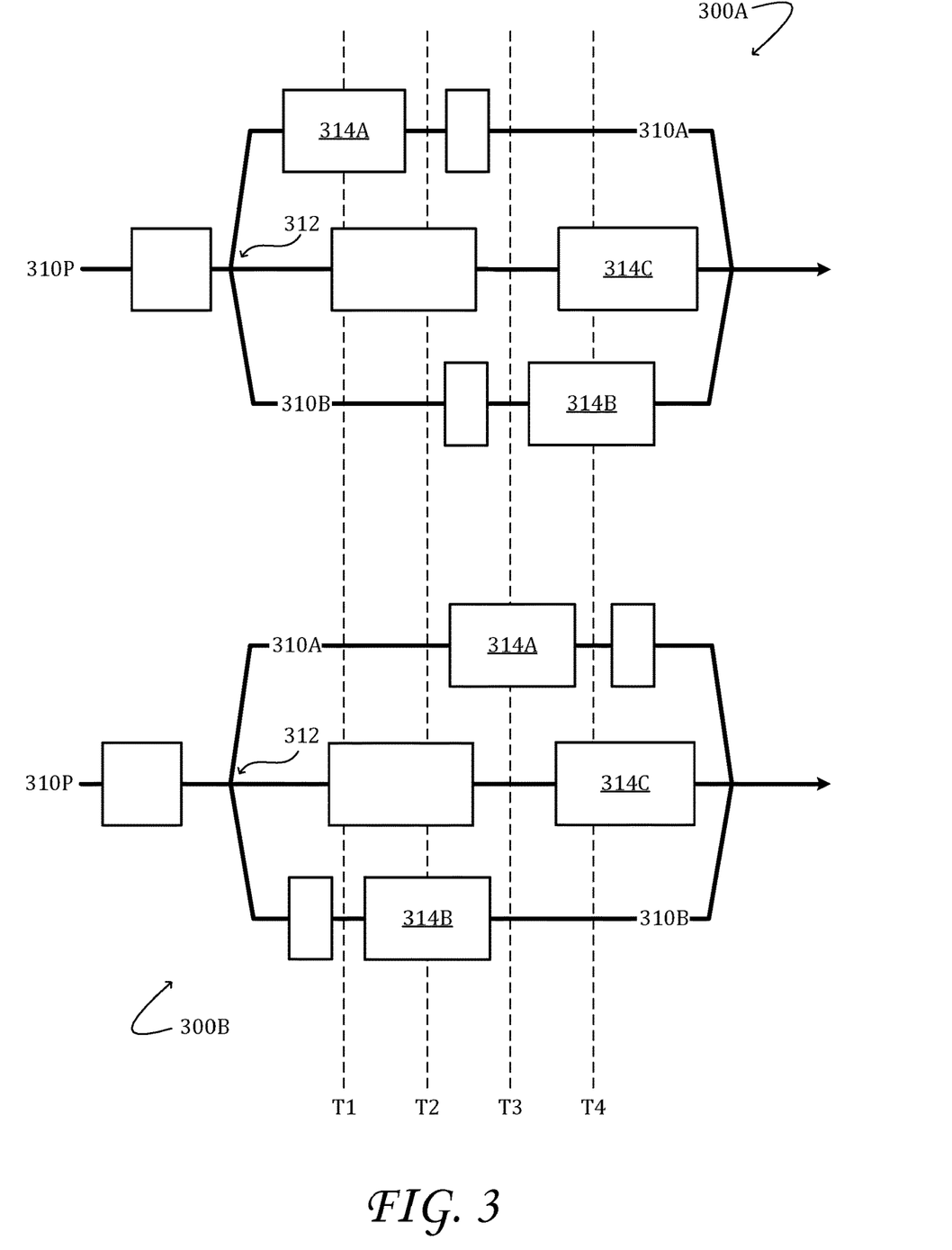
FIG. 3 is a schematic comparison of two example timelines that may occur during execution of a computer program configured for parallel thread execution.

FIG. 3 shows a comparison of two example timelines that may occur during execution on identical user computers 100B of identical executable code 122. This comparison refers back to the example video-game experience 200 illustrated in FIG. 2. In timelines 300A and 300B, executable code 122 executes a plurality of tasks on a parent thread 310P and then encounters a fork 312, where the parent thread spawns sibling threads 310A and 310B. Although three sibling threads (310A, 310B, and 310P) are illustrated, any number of sibling threads may be spawned. Each of the sibling threads may support one or more tasks. For instance, kinematic task 314A executing on thread 300A may update each ship's coordinates according to a suitable kinematic model. Meanwhile, battle task 314B executing on thread 300B may register the sinking of a ship due to enemy attack.

More particularly, in timeline 300A kinematic task 314A, at time T1, reads the coordinates $(X_A, Y_A)$ of ship 210 from data object 142 and writes updated coordinates $(X_B, Y_B)$ back to the data object. At time T4 battle task 314B delivers a boulder 220 to coordinates that coincide with the original coordinates $(X_A, Y_A)$. In this example, the battle task reads data object 142 to determine whether any ship is present at $(X_A, Y_A)$ at the time of delivery of the boulder 220. Timeline 300B is operationally identical, but the timing is different. In timeline 300B, kinematic task 314A updates the coordinates of the ship from $(X_A, Y_A)$ to $(X_B, Y_B)$ at time T3, and battle task 314B delivers the boulder 220 at time T2.

The timing differences T3−T1 and T4−T2 in the illustrated timelines may derive from various ephemeral conditions in the operating state of user computer 100C. Such conditions may include the presence or absence of previous cached states and/or unrelated processes executing on the user computer. Even relatively small timing differences may have a significant effect on future states of the executable code. This is evident from the illustrated example, where ship 210 sails on in timeline 300A but is sunk to the bottom of the harbor in timeline 300B. This example demonstrates the more general problem of non-determinism caused by thread-unsafe access to a data object in parallel thread execution. By contrast, the desired deterministic behavior requires that the same final state is observed on different systems having executed the same tasks, even if such tasks are run across multiple cores nearly simultaneously, but with small variations in timing or differences in core count across the different systems. Although the example above illustrates non-deterministic behavior arising from parallel threads that support different asynchronous functions (i.e., kinematic task 314A and battle task 314B), non-deterministic behavior may also occur when threads supporting analogous functions operate in parallel on different portions of an extended data space with shared access to at least one data object.

Various remedies and work-arounds can be used by a developer to correct a known instance of thread-unsafe data access and thereby overcome the issue of non-determinism in parallel thread execution. Such remedies rely, however, on the ability of the developer to intuit and find where the thread-unsafe access may have occurred. By contrast, the approach herein provides automatic detection of thread-unsafe access to selected data objects. To that end, thread-safety module 128 of FIG. 1 is configured to maintain a digital record of each instance of read or write access to one or more selected data objects from each of a plurality of sibling threads executing on user computer 100C.

Figure 4:
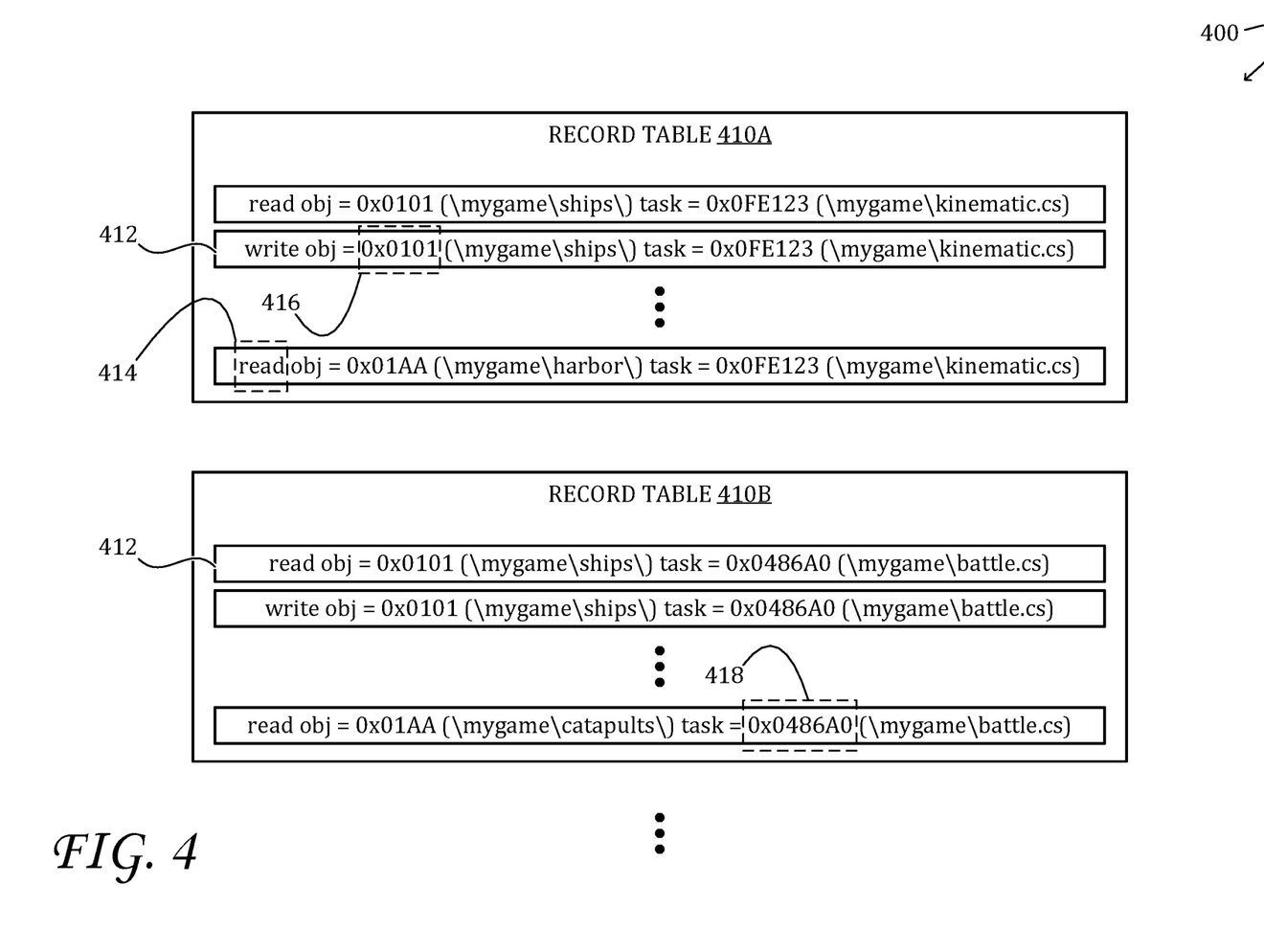
FIG. 4 shows aspects of an example digital record of read and write access to a plurality of data objects.

FIG. 4 shows aspects of an example digital record 400 in one, non-limiting example. Digital record 400 includes a plurality of record tables 410, each associated with a different, parallel thread. In this example, each thread in the system maintains its own record table recording access to one or more selected data objects. In other examples, each task may maintain its own record table. In still other examples, the digital record may include at least one record table that subsumes data-access activity across a plurality of parallel threads or tasks. Whether implemented as a unitary record table or series of thread- or task-specific record tables, digital record 400 includes a plurality of entries 412 that each correspond to an instance of read or write access to a data object, such as data object 142. Each entry includes an access indicator 414, which distinguishes between read and write access. Generally speaking, the digital record may record access to any, some, or all data objects accessed in executable code 122. In examples in which a single record table records access for a plurality of different data objects, each entry 412 may include a data-object identifier 416 that identifies the data object. In some examples, each entry 412 may include a task identifier 418 that identifies the task accessing the data object. In examples in which a single record table records access from a plurality of different threads, each entry may include a thread identifier that identifies the thread from which the data object is accessed.

In some examples, each record table may be created when each corresponding parallel thread is spawned. For example, when sibling threads 310A and 310B in FIG. 3 are spawned from parent thread 310P, two record tables may be created that correspond to each of the two sibling threads. In some examples, the record tables may be examined and compared when a read or write access of a data object occurs to determine if the read or write access is thread-safe. In other examples, when the sibling threads are rejoined, the corresponding record tables may be examined and compared to determine if there are any thread-unsafe instances of read or write access. For example, if sibling thread 310A writes to a data object that is read by sibling thread 310B or vice versa, then a thread-unsafe instance is identified. Similarly, if both sibling threads 310A and 310B write to the same data object, then a thread-unsafe instance is identified. These thread-unsafe instances of read or write access may lead to non-deterministic behavior. When these thread-unsafe instances are identified, they may be reported using various actions, as further explained with respect to FIG. 5, to enable a developer to fix the problem in the code and avoid the non-deterministic behavior.

Figure 5:
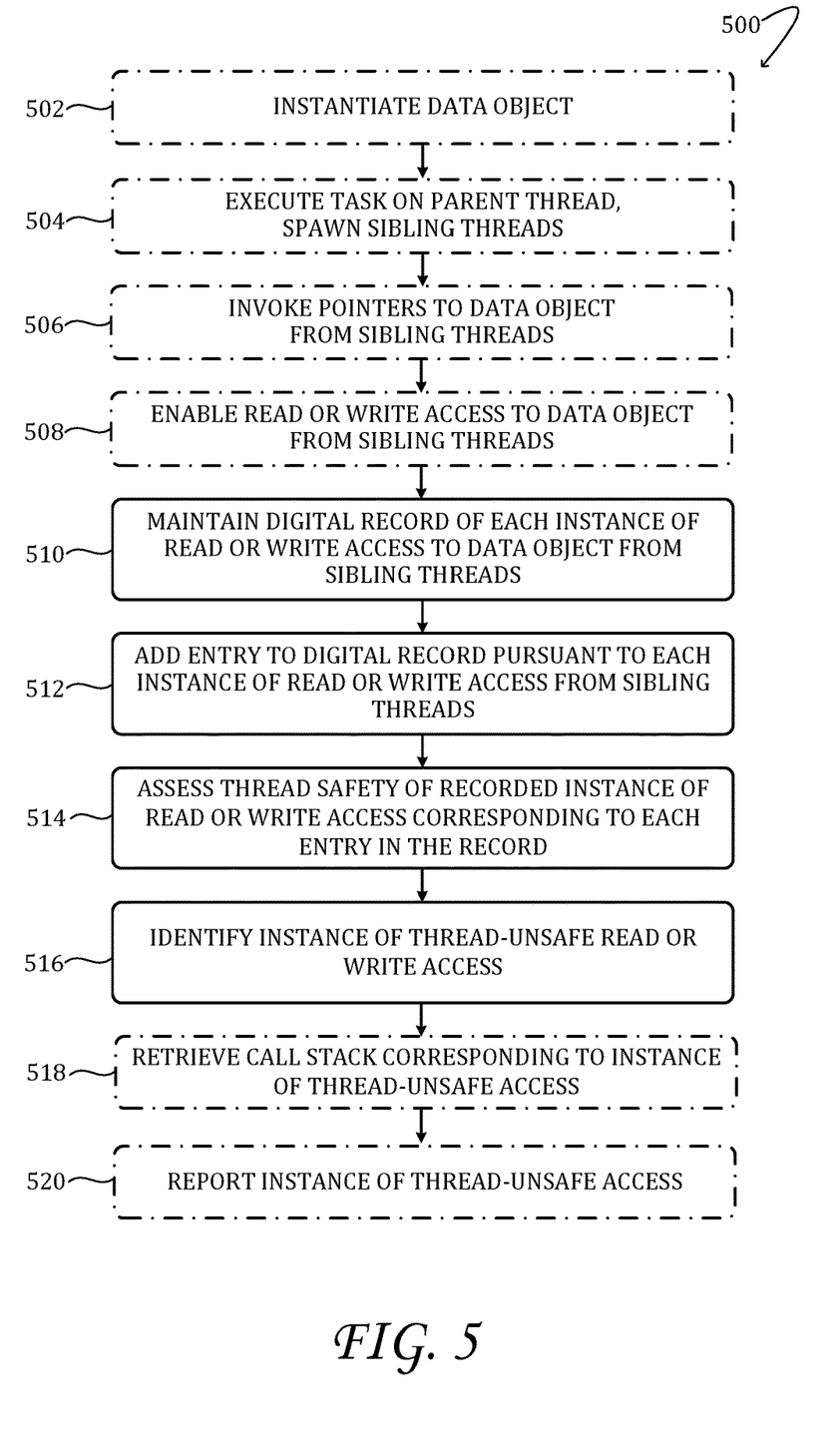
FIG. 5 shows aspects of an example method for thread-safe development of a computer program configured for parallel thread execution.

FIG. 5 shows aspects of an example method 500 for thread-safe development of a computer program configured for parallel thread execution. Method 500 may be executed on a computer system configured for parallel thread execution. Suitable computer systems include developer computer 100B or user computer 100C, for example. For ease of explanation, the methods herein are described with reference to the configurations introduced hereinabove. It will be understood, however, that these methods also may be used with different configurations.

At 502 of method 500, the computer system instantiates a data object. For ease of explanation, the description below refers to one data object, which neither requires nor precludes additional data objects, instantiated iteratively or in parallel. Indeed, the data object here referenced may be one of a plurality of data objects (any, some, or all of the data objects instantiated by the program code executing on the computer system), which may be handled analogously with respect to read and write access and thread-safety assessment and reporting. A complex program may access numerous data objects. In some implementations, recording each and every instance of read and write access to each and every data object, and subsequently assessing thread safety, may degrade overall performance. By contrast, desirable performance may be achieved by pre-selecting a relevant subset of data objects, for which read and write access is recorded and subsequently assessed for thread safety.

At 504, the computer system executes one or more tasks on a parent thread. In this example, the parent thread contains a fork, and when the fork is encountered, the parent thread spawns a plurality of sibling threads. Any, some, or all of the sibling threads may be declared expressly in the computer program, or otherwise drawn from a thread pool. Any, some, or all of the sibling threads may support one or more asynchronous tasks, which may access the data object instantiated at 502.

At 506, plural tasks executing on any of the plurality of sibling threads invoke pointers to the data object. At 508, the operating system of the computer system, pursuant to receipt of the pointers, enables read or write access to the data object to each task invoking a pointer. In some examples, the pointers may be modified or otherwise associated with event-handler logic of a thread-safety module.

As noted hereinabove and indicated at 510 of method 500, the thread-safety module (e.g., thread-safety module 128 of FIG. 1) maintains a digital record of each instance of read or write access to the data object from each of a plurality of sibling threads executing on the computer system. In some examples, the digital record may comprise a record table for each of the plurality of sibling threads from which the data object is accessed, such as record table 410A shown in FIG. 4. In other examples, a record table spanning plural sibling threads may be used. In some examples, each record table is created pursuant to the spawning, at 504, of the corresponding thread.

In some examples, receipt of a modified pointer may raise an event that directs the thread-safety module to add an entry corresponding to the read or write access to the digital record. At 512, accordingly, pursuant to each instance of the read or write access from the sibling threads, the thread-safety module adds an entry to the digital record. The entry comprises an indicator of access type for the given instance, such as the access type 414 shown in FIG. 4, which distinguishes between read and write access. As noted hereinabove, the entry may further comprise an indicator of the data object and/or sibling thread. The term 'pursuant to' is used herein to express causality between two events but neither requires nor precludes concurrency of the two events.

At 514, the thread-safety module (e.g., thread-safety module 128 of FIG. 1) assesses thread safety of the recorded instances of read or write access corresponding to any, some or all of the entries in the digital record. In some examples, thread safety is assessed pursuant to an instance of read or write access. In other examples, thread safety is assessed pursuant to rejuncture of the sibling threads. In some examples, the rejuncture is detected by logic of the parent thread that spawned the plurality of sibling threads. In other words, at the point at which two or more sibling threads are blocked and waiting for additional siblings to complete, data-record entries for blocked threads may be analyzed for conflicting access to common data objects. In one example, when each sibling thread finishes (e.g., blocks or sleeps), a copy of its record table is pushed onto a system queue, to be compared to the record tables of sibling threads. In other examples, the thread safety may be assessed pursuant to each instance of the read or write access—i.e., before the last entry has been written to any record table. Irrespective of the point at which the detection takes place, detecting thread-unsafe read or write access may comprise scanning through the record tables to detect each thread-unsafe instance of read or write access.

Thread-safety assessment may take various forms, which may be applied individually or in combination. Generally speaking, parallel reading of the same data object from two different threads is safe. Parallel writing to different objects is also safe. However, reading or writing to a data object when a parallel thread is also writing to the same data object may lead to non-deterministic behavior.

As noted above, instances of thread-unsafe read or write access to a data object may be detected by scanning through the entries of the digital record where such access is recorded. Returning briefly to FIG. 4, the thread-safety module may scan through entries 412 of the one or more record tables 410. Each entry corresponding to a given sibling thread may be compared against entries corresponding to other sibling threads—e.g., comparing respective data-object identifiers 416 to determine whether the compared entries refer to the same data object, and if so, parsing respective access identifiers 414 to distinguish thread-safe read/read access from thread-unsafe read/write or write/write access. In some examples, the scanning of plural record tables may be preceded by a sorting or collection step that collects entries referring to the same data object, for increased processing efficiency. In these and other implementations, in a scenario in which the plurality of sibling threads includes first and second threads that access the same data object, assessing the thread safety may include identifying a thread-unsafe instance in which the data object written from the first thread is read from the second thread. Alternatively or in addition, assessing the thread safety may include identifying a thread-unsafe instance in which the data object is written from the first thread and from the second thread.

At 516, one or more thread-unsafe instances of read or write access may be identified based on the assessment of thread safety at 514. If at least one thread-safe instance is detected, various reporting actions may be taken. Some of the reporting actions may require information from the call stack associated with the corresponding access to the data object on the user computer. At 518, optionally, a call stack corresponding to each instance of thread-unsafe access to a selected data object is retrieved. In some examples, a call stack may be captured at every read or write access.

At 520, the thread-safety module may report the one or more thread-unsafe instances of the read or write access identified at 516. In some examples, reporting the one or more thread-unsafe instances includes raising an exception in a debugger or elsewhere in IDE software. In some examples, reporting the one or more thread-unsafe instances includes outputting (e.g., logging) an identifier of the thread and/or the asynchronous task that accessed the data object in the thread-unsafe instance of read or write access. In some examples, a call stack corresponding to each instance of thread-unsafe access to a selected data object may be retrieved, and at least a portion of the call stack may be logged or otherwise reported.

In the examples envisaged herein, any, some, or all of the steps of the foregoing method may correspond to instructions executed by IDE software executing on a developer computer, such as developer computer 100B of FIG. 1. Alternatively or in addition, any, some, or all of the steps of the foregoing method may correspond to instructions executed by an application-programming interface (API) or class library attached to executable code 122 running on user computer 100C. In these examples, compiler 106 may attach an instance of thread-safety module 128 to the executable code. That alternative may be useful in scenarios involving final debugging of deployed computer program 102.

The manner of distributing such instructions among one or more developer computers is not particularly limited. In the example shown in FIG. 1, instructions associated with the foregoing methods are included in IDE software 104, held in non-volatile memory 132A of server computer 100A. The server computer comprises a network interface 194 coupled operatively to the non-volatile memory 132A and configured to distribute the instructions over any suitable network, such as the Internet. In some examples, the instructions may be distributed in a compressed data format. In other examples, the IDE software 104 or other method instructions may be distributed on data-storage media, such as an optical disk or flash drive.

No aspect of the foregoing methods or configurations should be understood in a limiting sense, because numerous extensions, omissions, and variations are also envisaged. In some examples, the methods herein may be further restricted by various filters configured to enhance system performance. Application of the methods may be filtered based on the context of the program execution (e.g., the game experience). For instance, application of the methods may be restricted to related tasks, such as kinematics task 314A and battle task 314B in the example hereinabove, where real-time synchronization is especially important. Application of the methods also may be restricted to time intervals or progress intervals of the game experience or other application where non-deterministic behavior may especially degrade the experience. In examples in which read and write access to a subset of commonly accessed data objects is recorded, but access to other data objects is ignored, the subset of objects may be specified in source code 120, via the associated class declarations or primitive declarations associated with the objects in the subset. In more particular examples, IDE software 104 may be configured to recognize a metacommand or macro invoked at or before the declaration, which signals that the data object being instantiated is to be tracked. That approach enables tracked objects to compile with the required modified pointers or flags that invoke the disclosed methods, and all other objects to compile normally.

Figure 6:
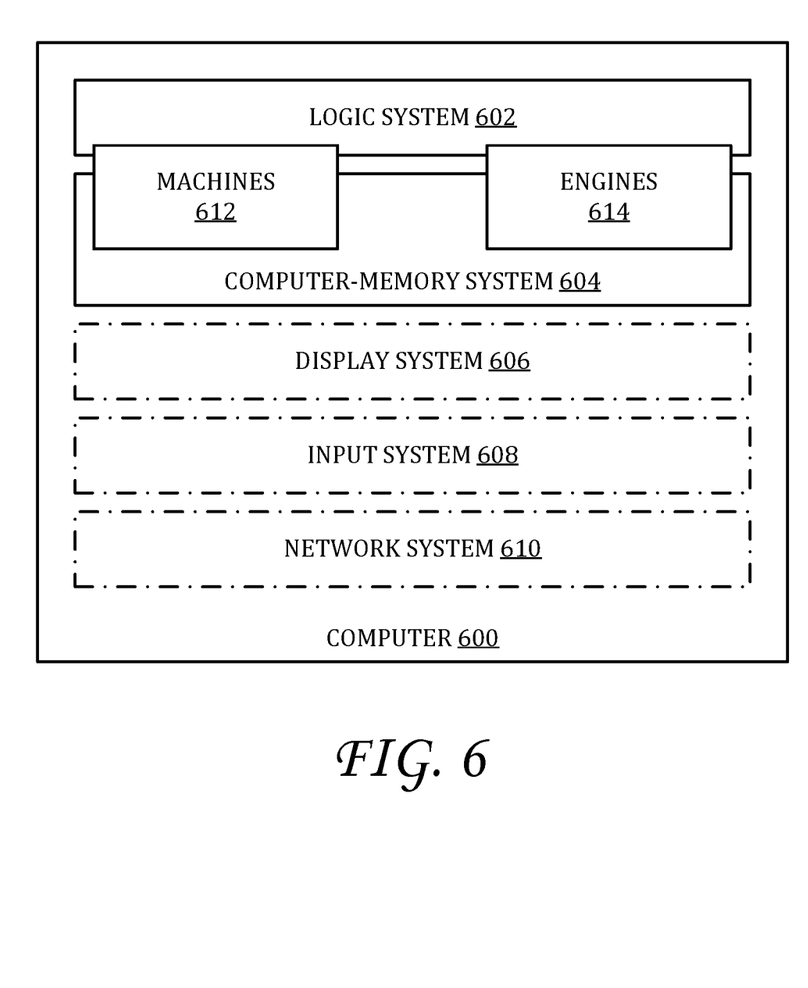
FIG. 6 shows additional aspects of an example computer system.

FIG. 6 provides a schematic representation of a computer 600 configured to provide some or all of the computer system functionality disclosed herein. Computer 600 may take the form of a personal computer, application-server computer, or any other computing device.

Computer 600 includes a logic system 602 and a computer-memory system 604. Computer 600 may optionally include a display system 606, an input system 608, a network system 610, and/or other systems not shown in the drawings.

Logic system 602 includes one or more physical devices configured to execute instructions. For example, the logic system may be configured to execute instructions that are part of at least one operating system (OS), application, service, and/or other program construct. The logic system 602 may include at least one hardware processor (e.g., microprocessor, central processor, central processing unit (CPU) and/or graphics processing unit (GPU)) configured to execute software instructions. Additionally or alternatively, the logic system 602 may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system 602 may be virtualized and executed by remotely-accessible, networked computing devices configured in a cloud-computing configuration.

Computer-memory system 604 includes at least one physical device configured to temporarily and/or permanently hold computer system information, such as data and instructions executable by logic system 602. When the computer-memory system 604 includes two or more devices, the devices may be collocated or remotely located. Computer-memory system 604 may include at least one volatile, non-volatile, dynamic, static, read/write, read-only, random-access, sequential-access, location-addressable, file-addressable, and/or content-addressable computer-memory device. Computer-memory system 604 may include at least one removable and/or built-in computer-memory device. When the logic system executes instructions, the state of computer-memory system 604 may be transformed—e.g., to hold different data.

Aspects of logic system 602 and computer-memory system 604 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 602 and computer-memory system 604 may cooperate to instantiate one or more logic machines 612 or engines 614. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer-memory devices.

Machines and engines may be implemented using any suitable combination of machine learning (ML) and artificial intelligence (AI) techniques. Non-limiting examples of techniques that may be incorporated in an implementation of one or more machines include support vector machines, multi-layer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 606 may be used to present a visual representation of data held by computer-memory system 604. The visual representation may take the form of a graphical user interface (GUI) in some examples. The display system may include one or more display devices utilizing virtually any type of technology. In some implementations, display system may include one or more virtual-, augmented-, or mixed reality displays.

When included, input system 608 may comprise or interface with one or more input devices. An input device may include a sensor device or a user input device. Examples of user input devices include a keyboard, mouse, or touch screen.

When included, network system 610 may be configured to communicatively couple computer 600 with one or more other computer. The network system 610 may include wired and/or wireless communication devices compatible with one or more different communication protocols. The network system 610 may be configured for communication via personal-, local- and/or wide-area networks.

In conclusion, one aspect of this disclosure is directed to a method to be executed on a computer system configured for parallel thread execution. The method comprises: maintaining a digital record of each instance of read or write access to a data object from each of a plurality of sibling threads executing on the computer system; pursuant to each instance of read or write access from a given sibling thread, adding an entry to the digital record, the entry comprising an indicator of access type for the given instance; assessing thread safety of the recorded instance of read or write access corresponding to each entry in the digital record; and identifying one or more thread-unsafe instances of read or write access based on the assessing of thread safety.

In some implementations, the entry further comprises an indicator of the data object. In some implementations, each instance of read or write access to the data object is via a modified resource pointer, and the entry is added by event-handler logic of the modified resource pointer. In some implementations, the digital record comprises a record table corresponding to each of the plurality of sibling threads, and each record table is created pursuant to spawning the corresponding thread. In some implementations, thread safety is assessed pursuant to detecting rejuncture of the plurality of sibling threads. In some implementations, the thread safety is assessed pursuant to each instance of read or write access. In some implementations, the plurality of sibling threads includes first and second threads, and identifying one or more thread-unsafe instances of read or write access includes identifying a thread-unsafe instance in which the data object written from the first thread is read from the second thread. In some implementations, the plurality of sibling threads includes first and second threads, and identifying one or more thread-unsafe instances of read or write access includes identifying a thread-unsafe instance in which the data object is written from the first thread and from the second thread. In some implementations, the method further comprises reporting the one or more thread-unsafe instances of read or write access. In some implementations, reporting the one or more thread-unsafe instances includes raising an exception. In some implementations, reporting the one or more thread-unsafe instances includes outputting an identifier of an asynchronous task that accessed the data object in the given instance of read or write access. In some implementations, reporting the one or more thread-unsafe instances includes outputting a portion of a call stack associated with the given instance of read or write access.

Another aspect of this disclosure is directed to a server system comprising a network interface; and, coupled operatively to the network interface, computer memory holding machine-readable instructions. When executed by a multi-core processing system, the machine-readable instructions cause the multi-core processing system to: maintain a digital record of each instance of read or write access to a data object from each of a plurality of sibling threads executing on the multi-core processing system, pursuant to each instance of read or write access from a given sibling thread, add an entry to the digital record, the entry comprising an indicator of access type for the given instance, assess thread safety of the recorded instance of read or write access corresponding to each entry in the digital record, and identify one or more thread-unsafe instances of read or write access based on the assessment of thread safety.

In some implementations, the instructions are instructions of an integrated development environment. In some implementations, the instructions are instructions of an application programming interface or library.

Another aspect of this disclosure is directed to a method to be executed on a computer system configured for parallel thread execution. The method comprises: maintaining a digital record of each instance of read or write access to a data object from each of a plurality of sibling threads executing on the computer system; pursuant to each instance of read or write access from a given sibling thread, adding an entry to the digital record, the entry comprising an indicator of access type for the given instance; assessing thread safety of the recorded instance of read or write access corresponding to each entry in the digital record; pursuant to assessing the thread safety, detecting at least one thread-unsafe instance of read or write access; and reporting the at least one thread-unsafe instance.

In some implementations, reporting the at least one thread-unsafe instances includes outputting a portion of a call stack associated with the at least one thread-unsafe instance. In some implementations, reporting the one or more thread-unsafe instances includes outputting an identifier of an asynchronous task that accessed the data object in the at least one thread-unsafe instance of read or write access. In some implementations, the plurality of sibling threads includes first and second threads, and detecting at least one thread-unsafe instance of read or write access includes identifying a thread-unsafe instance in which the data object written from the first thread is read from the second thread. In some implementations, the plurality of sibling threads includes first and second threads, and detecting at least one thread-unsafe instance of read or write access includes identifying a thread-unsafe instance in which the data object is written from the first thread and from the second thread.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method to be executed on a computer system configured for parallel thread execution, the method comprising:
maintaining a digital record of each instance of read or write access to a data object from each of a plurality of sibling threads executing on the computer system;
pursuant to each instance of read or write access from a given sibling thread, adding an entry to the digital record, the entry comprising an indicator of access type for the given instance;
assessing thread safety of the recorded instance of read or write access corresponding to each entry in the digital record; and
identifying one or more thread-unsafe instances of read or write access based on the assessing of thread safety.

2. The method of claim 1, wherein the entry further comprises an indicator of the data object.

3. The method of claim 1, wherein each instance of read or write access to the data object is via a modified resource pointer, and wherein the entry is added by event-handler logic of the modified resource pointer.

4. The method of claim 1, wherein the digital record comprises a record table corresponding to each of the plurality of sibling threads, and wherein each record table is created pursuant to spawning the corresponding thread.

5. The method of claim 1, wherein thread safety is assessed pursuant to detecting rejuncture of the plurality of sibling threads.

6. The method of claim 1, wherein the thread safety is assessed pursuant to each instance of read or write access.

7. The method of claim 1, wherein the plurality of sibling threads includes first and second threads, and wherein identifying one or more thread-unsafe instances of read or write access includes identifying a thread-unsafe instance in which the data object written from the first thread is read from the second thread.

8. The method of claim 1, wherein the plurality of sibling threads includes first and second threads, and wherein identifying one or more thread-unsafe instances of read or write access includes identifying a thread-unsafe instance in which the data object is written from the first thread and from the second thread.

9. The method of claim 1, further comprising reporting the one or more thread-unsafe instances of read or write access.

10. The method of claim 9, wherein reporting the one or more thread-unsafe instances includes raising an exception.

11. The method of claim 9, wherein reporting the one or more thread-unsafe instances includes outputting an identifier of an asynchronous task that accessed the data object in the given instance of read or write access.

12. The method of claim 9, wherein reporting the one or more thread-unsafe instances includes outputting a portion of a call stack associated with the given instance of read or write access.

13. A server system comprising:

a network interface; and coupled operatively to the network interface, computer memory holding machine-readable instructions that, when executed by a multi-core processing system, cause the multi-core processing system to:

maintain a digital record of each instance of read or write access to a data object from each of a plurality of sibling threads executing on the multi-core processing system, pursuant to each instance of read or write access from a given sibling thread, add an entry to the digital record, the entry comprising an indicator of access type for the given instance, assess thread safety of the recorded instance of read or write access corresponding to each entry in the digital record, and identify one or more thread-unsafe instances of read or write access based on the assessment of thread safety.

14. The server system of claim 13, wherein the instructions are instructions of an integrated development environment.

15. The server system of claim 13, wherein the instructions are instructions of an application programming interface or library.

16. A method to be executed on a computer system configured for parallel thread execution, the method comprising:

maintaining a digital record of each instance of read or write access to a data object from each of a plurality of sibling threads executing on the computer system;

pursuant to each instance of read or write access from a given sibling thread, adding an entry to the digital record, the entry comprising an indicator of access type for the given instance;

assessing thread safety of the recorded instance of read or write access corresponding to each entry in the digital record;

pursuant to assessing the thread safety, detecting at least one thread-unsafe instance of read or write access; and reporting the at least one thread-unsafe instance.

17. The method of claim 16, wherein reporting the at least one thread-unsafe instances includes outputting a portion of a call stack associated with the at least one thread-unsafe instance.

18. The method of claim 16, wherein reporting the one or more thread-unsafe instances includes outputting an identifier of an asynchronous task that accessed the data object in the at least one thread-unsafe instance of read or write access.

19. The method of claim 16, wherein the plurality of sibling threads includes first and second threads, and wherein detecting at least one thread-unsafe instance of read or write access includes identifying a thread-unsafe instance in which the data object written from the first thread is read from the second thread.

20. The method of claim 16, wherein the plurality of sibling threads includes first and second threads, and wherein detecting at least one thread-unsafe instance of read or write access includes identifying a thread-unsafe instance in which the data object is written from the first thread and from the second thread.

* * * * *